Figure 1:
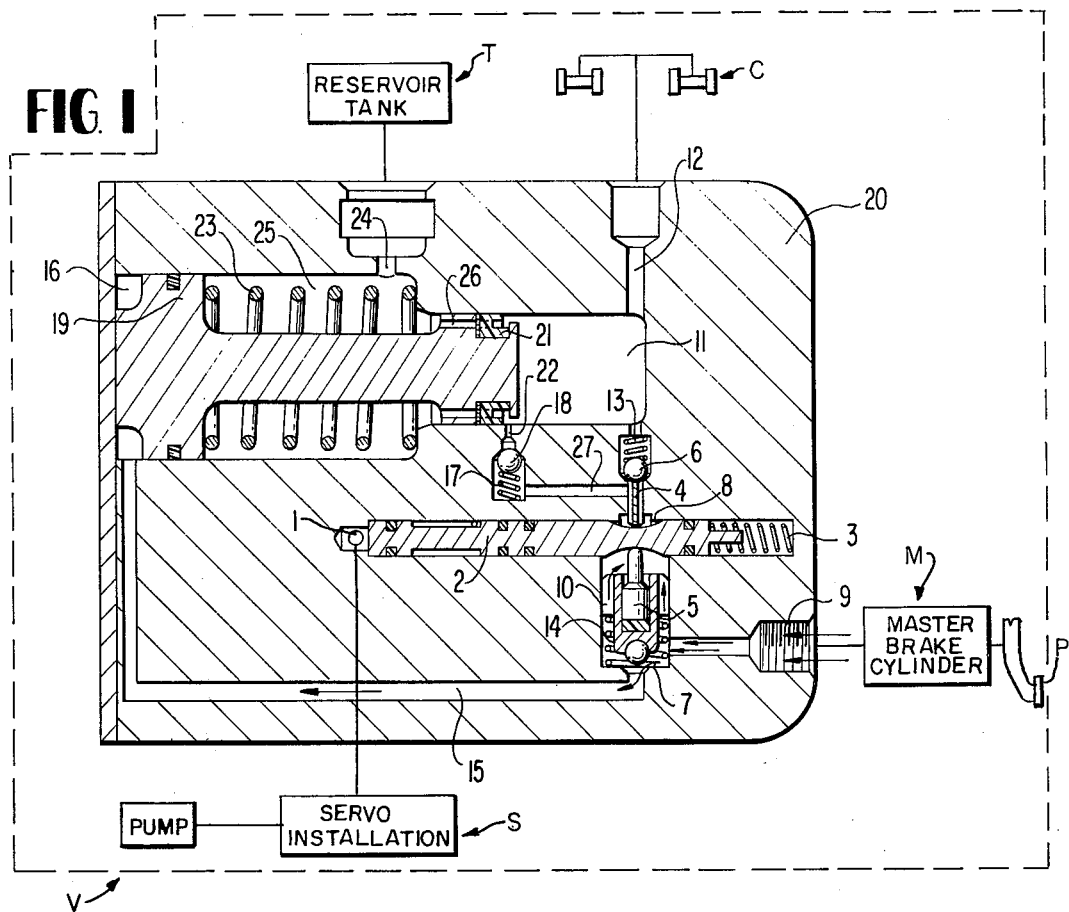

United States Patent

Resch

[11] 4,073,543
[45] Feb. 14, 1978

[54] SWITCHING DEVICE FOR THE INDIRECT ALTERATION OF THE MECHANICAL BRAKE PEDAL TRANSMISSION

[75] Inventor: Reinhard Resch, Stuttgart, Germany

[73] Assignee: Daimler-Benz Aktiengesellschaft, Germany

[21] Appl. No.: 662,413

[22] Filed: Mar. 1, 1976

[30] Foreign Application Priority Data

Mar. 1, 1975   Germany .............................. 2509077

[51] Int. Cl.² .................... B60T 11/28; B60T 13/16; B60T 17/18
[52] U.S. Cl. ........................................ 303/10; 60/582; 91/28; 303/84 A
[58] Field of Search ...................... 303/2, 6 R, 6 C, 10, 303/18, 84, 114, 115, 116; 188/349, 152; 60/550, 553, 567, 582; 91/28, 33

[56] References Cited

U.S. PATENT DOCUMENTS

| | | | |
|---|---|---|---|
| 2,945,352 | 7/1960 | Stelzer | 91/28 X |
| 3,659,905 | 5/1972 | Goulish | 303/114 |
| 3,861,757 | 1/1975 | Jackson et al. | 303/115 |
| 3,918,765 | 11/1975 | Hayashida | 303/6 R |

Primary Examiner—Trygve M. Blix
Assistant Examiner—Douglas C. Butler
Attorney, Agent, or Firm—Craig & Antonelli

[57] ABSTRACT

A shifting apparatus for the indirect changing of the mechanical brake pedal transmission ratio in case of failure of the servo-assist of a motor vehicle brake force booster system, in which the shifting apparatus can be installed at any suitable place of the motor vehicle as well as in the lines extending between the master brake cylinder and the wheel cylinders; the control piston which is arranged in the shifting apparatus is actuated by the medium put under pressure by the pump of the servo-installation, and undertakes the shifting control of the pressure medium coming from the master cylinder to attain a shifting action in case of failure of the servo-installation.

13 Claims, 2 Drawing Figures

SWITCHING DEVICE FOR THE INDIRECT ALTERATION OF THE MECHANICAL BRAKE PEDAL TRANSMISSION

The present invention relates to a shifting apparatus for the indirect change of the mechanical brake pedal transmission in case of failure of the servo-assist of a motor vehicle brake booster installation or brake servo-installation.

Heavy vehicles require as a rule a servo-assist for a safe and comfortable actuation of the brake. An installation therefor includes a pump which puts a brake medium under pressure that is fed to the individual brake circuits of the brake system of the motor vehicle possibly by way of a brake force booster. According to legally prescribed regulations, certain minimum braking actions must be assured in case of failure of this servo-installation which must be attainable with predetermined pedal forces. This requirement is satisfied with the aid of the shifting apparatus according to the present invention which with a given work, which the driver must apply at the brake pedal, reduces the factor pedal-force and increases the factor pedal-path within permissive limits.

Installations are known in the prior art which, in case of failure of the servo-installation, change the hydraulic translation or transmission ratio. These prior art installations, however, relate only to shifting installations which are integrated into hydraulic boosters or master brake cylinders or are connected directly with the same. This coordination has, for the most part, as a consequence installation difficulties or requires an additional change in the already existing brake system. The prior art shifting mechanisms can therefore not be installed on the already existing brake installations without special changes. Additionally, the prior art installations are costly in construction and do not exhibit the desired effect.

It is the aim of the present invention to provide a transmission shifting apparatus which, in case of failure of the servo-installation, permits a higher hydraulic overall transmission ratio to become effective and, on the other, can be installed in the vehicle without being tied to any particular location. Furthermore, no additional changes should have to be undertaken in the already existing brake system during the installation of the shifting apparatus according to the present invention.

The underlying problems are solved according to the present invention in that a shifting apparatus is adapted to be installed at any desired place of the motor vehicle as well as in the lines extending between the master brake cylinder and the wheel cylinders and in that a control piston is arranged in the shifting apparatus which actuated by the medium put under pressure by the pump of the servo-installation, undertakes the control of the pressure medium coming from the master cylinder for the purpose of a shifting action in case of failure of the servo-installation.

According to a further feature of the present invention, a stepped or differential piston cooperating with valves, expansion bores or the like may be arranged in the shifting apparatus, which during normal operation is not actuated or loaded by the pressure from the master cylinder and which, in case of failure of the servo-installation, is acted upon on its larger cross-sectional area by the pressure existing in the master cylinder and which as a result thereof exerts pressure with a hydraulic transmission on the medium fed to the wheel cylinders by means of the smaller step cross section.

However, a corresponding shifting apparatus may be constructed also still more differentiatingly so that in a first brake phase, the braking takes place with an unchanged hydraulic transmission ratio whereas during further braking, the braking is realized with an increased hydraulic transmission ratio. For that purpose, a stepped or differential piston cooperating with valves, expansion bores or the like may be arranged in the shifting apparatus which in the normal case is not loaded or actuated by the pressure from the master cylinder and which, in case of failure of the servo-installation, acts as first as piston producing braking pressure for the wheel cylinders with an unchanged hydraulic transmission ratio, whereas with a stronger braking action, it acts as piston producing braking pressure for the wheel cylinders with a higher hydraulic overall transmission ratio.

In detail, the shifting apparatus may be so constructed that in case of failure of the servo-pressure the control piston, displaced by a spring, closes a valve leading directly to the wheel cylinders and opens a second valve by enabling displacements of valve plungers, conducts the pressure from the master cylinder to the larger cross-sectional area of the differential piston and as a result thereof, the smaller differential piston exerts pressure with a smaller hydraulic transmission ratio on the medium leading to the wheel cylinders. On the other hand, for a stepped transmission or translation of the pressure transmission, the shifting apparatus may also be so constructed that a valve opening under control pressure which connects the master cylinder directly with the wheel cylinders is closed in case of failure of the servo-pressure by means of a compression spring and as a result thereof the pressure of the master cylinder is conducted onto the larger cross section of the differential piston which, at first, acts with unchanged hydraulic translation or transmission ratio on the medium leading to the wheel cylinders and which after passing over expansion ports or holes connects an intermediate differential piston space by way of a line extending in the cylinder housing with an annular space provided between two main steps of equal size of the stepped or differential piston, whereby the annular space is in communication with a reservoir tank, so that now only the smaller step of the stepped or differential piston still exerts pressure with a smaller hydraulic transmission on the medium directly in communication with the wheel cylinders.

In order to enable without difficulty the return of the master cylinder during release of the brake pedal, the pressure medium must be able to flow back out of the wheel cylinders. For that purpose, provision is made that a valve bore provided with a check valve leads into the pressure space delimited by the stepped piston cylinder and by the smallest cross section of the stepped piston, which opens when the master cylinder piston is retracted.

Accordingly, it is an object of the present invention to provide a shifting apparatus for the indirect change of the mechanical brake pedal transmission ratio which avoids by simple means the aforementioned shortcomings and drawbacks encountered with the prior art.

Another object of the present invention resides in a shifting apparatus for the indirect change of the mechanical brake pedal transmission ratio which can be installed at any suitable location of the vehicle and obviates the need for changes in the already existing brake system.

A still further object of the present invention resides in a shifting apparatus of the type described above which is relatively simple, relatively inexpensive and extremely effective for the intended purposes.

Still another object of the present invention resides in a shifting apparatus for indirectly changing the mechanical brake pedal transmission ratio which makes possible to obtain a higher hydraulic overall transmission ratio in case of failure of the servo-installation, yet is not tied to any particular location in the vehicle for its installation.

Figure 2:
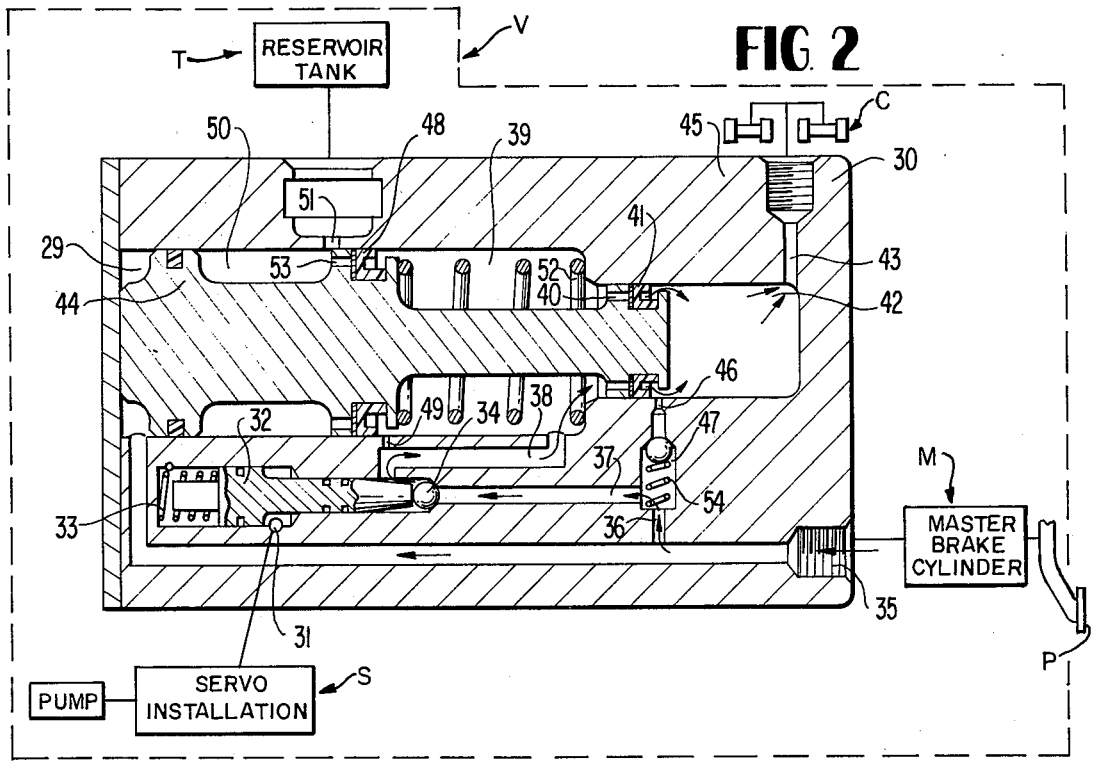

These and other objects, features and advantages of the present invention will become more apparent from the following description when taken in connection with the accompanying drawing which shows, for purposes of illustration only, two embodiments in accordance with the present invention, and wherein:

FIG. 1 is a cross-sectional view through a first embodiment of a shifting apparatus in accordance with the present invention having a single step hydraulic transmission; and FIG. 2 is a longitudinal cross-sectional view through a modified embodiment of a shifting apparatus with a two-step hydraulic transmission.

Referring now to the drawing, and more particularly to FIG. 1, a shifting apparatus for indirectly changing a transmission ratio of a mechanical brake pedal P upon a failure of a servo-assist of a brake-force servo-installation S of a motor vehicle V is provided with the shifting apparatus including a bore 1 in a cylinder housing 20, through which the pressure produced in the servo-installation is fed from the servo-installation to the shifting apparatus. This pressure normally acts on a control piston 2 and displaces the same against the pressure of a spring 3 for such length of time until the free end of the control piston 2 projecting toward the right in the drawing abuts at the bottom of its guide bore. As a result of this movement of the control piston 2, the valve plungers 4 and 5 are displaced outwardly in their guidance by reason of being pressed out of the narrow places of the control piston 2 so that the plunger 4 opens a valve 6 and the plunger 5 closes a valve 7.

If, in this position of the control valve 2, a pressure is being built up in the master brake cylinder M in a conventional manner, then the pressure medium flows to the wheel brake cylinders C by way of the bore 9, the grooves 10 in the valve 7, by way of an annular groove 8, the valve plunger 4 provided with grooves, the valve 6 and a pressure space 11 and by way of the bore 12.

In case of failure of the servo-installation S, the control pressure which had been fed by way of the bore 1, collapses. As a result thereof, the control piston 2 is forced back by the spring 3 toward the left in the drawing into its starting position. As a result thereof, also the valve plunger 4 is forced back by a spring 13 into its starting position and therewith the valve 6 is closed. At the same time, the valve plunger 5 is forced by a spring 14 into its starting position and as a result thereof the valve 7 is opened. If, in this position of the valve 7, a pressure is being built up in the master brake cylinder M, then the pressure medium flows by way of the bore 9 and the bore 15 into the piston pressure space 16. The pressure cannot flow toward the other side of the piston because the valve 6 is closed by a spring 13 which is so strong that it cannot be opened by the pressure of the master brake cylinder M. Additionally, a further valve 18 is kept closed by a spring 17.

A stepped or differential piston 19 is guided within the housing 20. The stepped or differential piston 19 is set into movement toward the right in the drawing in the direction toward the pressure space 11 by the pressure fed to the piston pressure space 16 by way of the bore 9 and the bore 15. A sealing sleeve 21 thereby passes over an expansion port or bore 22 which is in communication with the valve 18. As a result of the stepped arrangement of the differential piston, a pressure is being produced in the pressure space 11 which is greater than the pressure built up in the piston pressure space 16. The pressure produced in the pressure space 11 is fed to the wheel brake cylinders by way of the bore 12.

When the brake pedal P is released, the differential piston 19 is forced back into its starting position with the aid of a spring 23. Pressure fluid can thereby be sucked-in from the reservoir tank T by way of a bore 24, the space 25 and the sleeve 21.

The thermal expansion of the pressure medium with a non-actuated brake pedal P and with a lost servo-assist can take place by way of an expansion bore 22 after overcoming the spring force of the spring 17 of the valve 18, by way of bore 27, the plunger 4 provided with grooves, the groove 10, the bore 9 and the corresponding master cylinder bores.

In the embodiment illustrated in FIG. 2, a stepped or differential piston 44 operates graduated with differently large pressures. Also in this embodiment, pressure produced by a servo-installation is conducted through a bore 31 provided in the housing 30 to the control piston 32 so that the latter, with an intact servo-installation S, is displaced toward the left in the drawing against the pressure of the spring 33 and as a result thereof, a valve 34 is opened. If in this valve position pressure is being built-up in a known manner in the master brake cylinder M, then the pressure medium flows by way of bores 35 and 36, a line 37, the valve 34, a line 38 into a spring space 39, and from there by way of bores 40 and a sleeve 41 into a pressure space 42. The pressure medium is conducted from this pressure space 42 to the individual wheel cylinders C by way of the line 43. Simultaneously, the pressure medium flows to the piston space 29. However, the stepped or differential piston 44 inserted into the corresponding bore remains stationary because the same pressures prevail on both sides of the large step.

Upon release of the brake pedal P, the pressure relief may take place by way of expansion hole 46 and valve 47.

In case of failure of the servo-installation S, the control pressure, which had been applied onto the control piston 32 by way of the bore 31, collapses. As a result thereof, the control piston 32 can be displaced toward the right as viewed in the drawing by the spring 33 and consequently the valve 34 is closed. The spring 33 is selected so strong that the valve 34 remains closed also with the maximum pressure production in the master brake cylinder M if the servo-installation S does not supply a pressure by way of the bore 31.

If with a collapsed pressure of the servo-installation S, i.e., with a closed valve 34, a pressure is being built-up in the master brake cylinder M, then the pressure medium flows by way of the bore 35 into the piston pressure space 29 and acts with pressure upon the differential piston 44. As a result of the one-sided pressure actuation, the stepped or differential piston 44 is set into motion in the direction toward the pressure space 42.

The sealing sleeves 41 and 48 thereby pass over or valve corresponding expansion bores 46 and 49 whereby a pressure builds up also in the intermediate step space 39. The pressure medium now flows from the space 39 by way of the bore 40 and the sleeve 41 permeable in the direction toward the pressure space 42, into the pressure space 42. From there, the wheel brake cylinders C are again acted upon by way of the bore 43. The valve 47 thereby remains closed.

If corresponding to a calculation the larger piston area of the stepped piston 44 is so selected that as regards area it corresponds to the area of the master cylinder piston, then the braking takes places with unchanged hydraulic transmission ratio during the just-described braking phase. With a further actuation of the brake and consequently with a further displacement of the stepped piston in the direction toward the pressure space 42, the sealing sleeve 48 passes over the expansion bore 49 so that the intermediate step space 39 is connected by way of the expansion bore 49 and the bore 38 with an annular space 50 so that now the pressure in the intermediate step space 39 decreases. Beginning with this brake phase, braking takes place with a higher hydraulic overall transmission. The higher hydraulic transmission ratio results during this braking phase from the force equilibrium of the adjusted pressure in the piston space 29 which is transmitted onto the pressure space 42 increased at the ratio of the large piston area to the small piston area.

During the release of the brake pedal P, the stepped or differential piston 44 is being forced back into its starting position by the spring 52. Pressure medium can thereby be sucked-in from the reservoir tank T by way of the bores 51, 53 and 40.

The thermal expansion of the pressure medium with a non-actuated brake pedal P and with a lost servo-installation S can take place by way of the expansion bore 46 after overcoming the force of the spring 54 of the valve 47 by way of the bores 36 and 35 and corresponding master cylinder expansion bores.

The embodiments illustrated in FIGS. 1 and 2 are provided in single-circuit brake systems. For the most part, it also suffices in two-circuit systems to provide such a shifting apparatus only in one brake circuit, namely, in the brake circuit for the front wheels because the requirements made by law can be fulfilled already therewith. If, however, still larger amplifications should become necessary so that a shifting apparatus has to be provided in each brake circuit, a similar apparatus may, of course, also be installed in a corresponding manner in a second circuit. It would then be appropriate to assemble the two shifting apparatus symmetrically at one another so that the associated piston pressure spaces 29 are disposed adjacent one another.

The advantages which can be achieved with a shifting apparatus according to the present invention compared to the prior art installations, reside in summary in that the shifting apparatus in accordance with the present invention can be installed in the vehicle V at any suitable, desired place without being tied to any particular location thereof, that they require no additional changes in the existing braking system and can be utilized for all pressure medium-actuated brake systems.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A shifting apparatus for indirectly changing a transmission ratio of a mechanical brake pedal in case of a failure of a servo-assist of a motor vehicle brake-force servo-installation, the servo-installation including a pump means for pressurizing a medium to provide a servopressure, the vehicle brake system including wheel cylinders, brake lines communicating with the wheel cylinders, and a master brake cylinder communicating with the shifting apparatus for supplying a pressure medium to the wheel cylinders through the brake lines, characterized in that the shifting apparatus is installed at any desired place of the motor vehicle in communication with the brake lines as well as in brake lines extending between the master brake cylinder and wheel cylinders, said shifting apparatus including a control piston means actuated by the pressure medium from the pump means of the servo-installation for effecting a shifting control of a flow path of the pressure medium from the master cylinder in the shifting apparatus upon a failure of the servo-installation, and in that a differential piston means having at least one large cross-sectional area and small cross-sectional area is arranged in the shifting apparatus for controlling a pressure medium, a valve means arranged in the shifting apparatus for controlling a flow of the pressure medium therein from the master brake cylinder, said control piston means, said valve means and said differential piston means are arranged in the shifting apparatus such that said differential piston means in a normal operating condition is non-actuated by the pressure medium from the master brake cylinder and, upon a failure of the servo-installation, the pressure medium from the master brake cylinder acts upon the large cross-sectional area of the differential piston means by a pressure prevailing in the master brake cylinder so as to exert a pressure on the pressure medium in a brake line communicating with the wheel cylinders by the small cross-sectional area of the differential piston means with a hydraulic transmission.

2. A shifting apparatus according to claim 1, characterized in that the differential piston means, in case of failure of the servo-installation, acts as piston means for producing a brake pressure of the wheel cylinders initially with a non-changed hydraulic transmission and a higher overall hydraulic transmission with a stronger braking.

3. A shifting apparatus according to claim 2, characterized in that said valve means in a first position communicates the master brake cylinder directly with the wheel cylinders and in a second position communicates the master brake cylinder with the large cross-sectional area of the differential piston means, a compression spring means is arranged at said valve means for displacing said valve means to the second position upon a failure of the servo-installation whereby a pressure of the pressure medium of the master brake cylinder is conducted to the large cross-sectional area of the differential piston means which initially is operable to exert pressure on the pressurized medium in the lines leading to the wheel cylinders with an unchanged hydraulic transmission.

4. A shifting apparatus according to claim 3, characterized in that an expansion hole means is arranged in the shifting apparatus for permitting a thermal expansion of the pressure medium, said differential piston means being arranged in the shifting apparatus so as to be displaceable to pass over said expansion hole means, space means are provided in the shifting apparatus for accommodating said differential piston means, said differential piston means includes two spaced main steps of equal size defining one large cross-sectional area and a smaller step spaced from the main steps defining the small cross-sectional area, line means are provided for communicating said valve means with said space means, said expansion hole means and said line means being arranged such that after said differential piston means has passed over said expansion hole means a space between the two spaced main steps is communicated with an annular space between the two main steps and the smaller step so that only the smaller step still exerts a pressure on the pressure medium communicated to the wheel cylinders with a larger hydraulic transmission.

5. A shifting apparatus according to claim 4, characterized in that a reservoir tank means is provided for accommodating a supply of pressure medium, bore means are provided for communicating said annular space with said reservoir tank means.

6. A shifting apparatus according to claim 5, characterized in that a valve line communicates with said expansion hole means, a check valve means is arranged in said valve line for compensating thermal expansions of the pressure medium with a non-retracted brake.

7. A shifting apparatus according to claim 1, characterized in that a further valve means is arranged in the shifting apparatus for controlling a flow of pressure medium to the wheel cylinders, said control piston means includes a valve plunger means for selectively opening and closing said valve means and said further valve means, spring means are provided for displacing said control piston means and said valve plunger means upon a failure of the servo-installation, said spring means displacing said control piston means so as to close said further valve means upon a failure of the servo-installation and open said valve means so as to enable a transmission of pressure medium from the master brake cylinder to the large cross-sectional area of the differential piston means with the small cross-sectional area of the differential piston means exerting a pressure on the pressure medium fed to the wheel cylinders with a larger hydraulic transmission.

8. A shifting apparatus according to claim 1, characterized in that a differential piston means is arranged in the shifting apparatus for controlling a pressure of the pressure medium, valve means are arranged in the shifting apparatus for controlling the flow of the pressure medium in the shifting apparatus, said valve means having a first position for communicating the master brake cylinder directly with the wheel cylinders and a second position communicating the master brake cylinder with the differential piston means, said control piston means is operatively connected with said valve means such that upon a failure of the servo-installation said valve means is displaced to the second position whereby said differential piston means functions as a piston means for producing a brake pressure for the wheel cylinders initially with a non-changed hydraulic transmission and a higher overall hydraulic transmission with a stronger braking.

9. A shifting apparatus according to claim 1, characterized in that a a pressure space means is provided in the shifting apparatus for accommodating the differential piston means, valve line means for communicating the pressure space means with a further line in the shifting apparatus, and in that a check valve means is arranged in said valve line means for compensating thermal expansions of the pressure medium with a retracted master brake cylinder piston.

10. A shifting apparatus for indirectly changing a transmission ratio of a mechanical brake pedal in case of a failure of a servo-assist of a motor vehicle brake-force servo-installation, the servo-installation including a pump means for pressurizing a medium to provide a servo-pressure, the vehicle brake system including wheel cylinders, brake lines communicating with the wheel cylinders, and a master brake cylinder communicating with the shifting apparatus for supplying a pressure medium to the wheel cylinders through the brake lines, characterized in that the shifting apparatus is installed at any desired place of the motor vehicle in communication with the brake lines as well as in brake lines extending between the master brake cylinder and wheel cylinders, said shifting apparatus including a control piston means actuated by the pressurized medium from the pump means of the servo-installation for effecting a shifting control of a flow path of the pressure medium from the master cylinder in the shifting apparatus upon a failure of the servo-installation, and in that a first valve means is provided in the shifting apparatus for controlling a flow of the pressure medium from the master brake cylinder directly to the wheel cylinders, a differential piston means is arranged in the shifting apparatus for controlling a pressure of the pressure medium, a second valve means is arranged in the shifting apparatus for controlling a flow of pressure medium from the master brake cylinder to said differential piston means, and in that the control piston means includes a valve plunger means for selectively opening and closing said first and second valve means, a spring means is provided for displacing said control piston means and said valve plunger means upon a failure of the servo-installation, said spring means displacing said control piston means so as to close said first valve means and open said second valve means whereby a transmission of pressure medium from the master brake cylinder to the differential piston means results such that the differential piston means exerts a pressure on the pressure medium fed to the wheel cylinders with a larger hydraulic transmission.

11. A shifting apparatus for indirectly changing a transmission ratio of a mechanical brake pedal in case of a failure of a servo-assist of a motor vehicle brake-force servo-installation, the servo-installation including a pump means for pressurizing a medium to provide a servo-pressure, the vehicle brake system including wheel cylinders, brake lines communicating with the wheel cylinders, and a master brake cylinder communicating with the shifting apparatus for supplying a pressure medium to the wheel cylinders through the brake lines, characterized in that the shifting apparatus is installed at any desired place of the motor vehicle in communication with the brake lines as well as in brake lines extending between the master brake cylinder and wheel cylinders, said shifting apparatus including a control piston means actuated by the pressurized medium from the pump means of the servo-installation for effecting a shifting control of a flow path of the pressure medium from the master cylinder in the shifting apparatus upon a failure of the servo-installation, and in that a differential piston means is provided in the shifting apparatus for controlling a pressure of the pressure medium, a valve means is provided in the shifting apparatus for controlling the flow of the pressure medium in the shifting apparatus, said valve means having a first position communicating the master brake cylinder directly with the wheel cylinders and a second position communicating the master brake cylinder with the differential piston means, a compression spring arranged at said valve means for displacing said valve means to the second position upon a failure of the servo-installation whereby a pressure of the pressure medium of the master brake cylinder is conducted to the differential piston means which initially is operable to exert pressure on the pressure medium leading to the wheel cylinders with an unchanged hydraulic transmission.

12. A shifting apparatus according to claim 11, characterized in that an expansion hole means is arranged in the shifting apparatus for permitting a thermal expansion of the pressure medium, said differential piston means being arranged in the shifting apparatus so as to be displaceable to pass over said expansion hole means, space means are provided for accommodating said differential piston means, said differential piston means includes two spaced main steps of equal size and a smaller step spaced from the main steps defining the small cross-sectional area, line means are provided for communicating said valve means with said space means, said expansion hole means and said line means being arranged such that after said differential piston means has passed over said expansion hole means a space between the two spaced main steps is communicated with an annular space between the two main steps and the smaller step so that only the smaller step still exerts a pressure on the pressure medium communicated to the wheel cylinders with a larger hydraulic transmission.

13. A shifting apparatus according to claim 12, characterized in that a reservoir tank means is provided for accommodating a supply of pressure medium, bore means are provided for communicating said annular space with said reservoir tank means.

* * * * *